United States Patent [19]

Sugiura et al.

[11] Patent Number: 4,930,007
[45] Date of Patent: May 29, 1990

[54] DIGITAL COLOR IMAGE PROCESSING METHOD AND APPARATUS FOR DISCRIMINATING HIGH RESOLUTION AREAS OF A COLOR IMAGE SIGNAL AND CONTROLLING IMAGE PROCESSING IN ACCORDANCE WITH THE DISCRIMINATION

[75] Inventors: Susumu Sugiura, Yamato; Yasuo Kouzato, Tokyo; Yukio Masuda, Atsugi, all of Japan

[73] Assignee: Canon Kabushiki Kaisha, Tokyo, Japan

[21] Appl. No.: 358,498

[22] Filed: May 30, 1989

Related U.S. Application Data

[63] Continuation of Ser. No. 58,625, Jun. 4, 1987, abandoned, which is a continuation of Ser. No. 608,238, May 8, 1984, abandoned.

[30] Foreign Application Priority Data

May 10, 1983 [JP] Japan .................. 58-81140

[51] Int. Cl.$^5$ .................. H04N 1/46; H04N 1/40
[52] U.S. Cl. .................. 358/75; 358/298; 358/456; 358/462; 358/467
[58] Field of Search .................. 358/75, 75 IJ, 78, 79, 358/80, 283, 298, 456, 457, 459, 462, 465, 466, 467

[56] References Cited

U.S. PATENT DOCUMENTS

| | | | |
|---|---|---|---|
| 4,251,837 | 2/1981 | Janeway, III | 358/283 |
| 4,410,909 | 10/1983 | Ueda et al. | 358/75 |
| 4,413,275 | 11/1983 | Horiuchi et al. | 358/75 IJ |
| 4,517,606 | 5/1985 | Yokomizo et al. | 358/283 |
| 4,547,811 | 10/1985 | Ochi et al. | 358/283 |
| 4,558,356 | 12/1985 | Toda et al. | 358/75 |
| 4,595,948 | 6/1986 | Itoh et al. | 358/75 IJ |
| 4,642,681 | 2/1987 | Ikeda | 358/75 |
| 4,663,662 | 5/1987 | Sekizawa et al. | 358/75 |
| 4,682,216 | 7/1987 | Sasaki et al. | 358/79 |
| 4,786,976 | 11/1988 | Takao et al. | 358/298 |

FOREIGN PATENT DOCUMENTS

| | | |
|---|---|---|
| 3047633 | 10/1981 | Fed. Rep. of Germany . |
| 3129026 | 3/1982 | Fed. Rep. of Germany . |
| 3374 | 1/1983 | Japan . |
| 58-44860 | 3/1983 | Japan .................. 358/298 |
| 58-44861 | 3/1983 | Japan .................. 358/298 |
| 58-153455 | 9/1983 | Japan .................. 358/283 |

OTHER PUBLICATIONS

Heinwig Lang, *Farbmetrik und Farbfernsehen*, R. Oldenbourg Verlag, Munich, 1978, pp. 427-431.

Günter Keppler, "PCR-die programmierte Farbrücknahme", *Klischograph* 1982, Dr.-Ing. Rudolf Mell GmbH, Kiel, Federal Republic of Germany, 1982, pp. 22-23.

Wong, Kwan Y. et al., "Adaptive Switching of Dispersed and Clustered Halftone Patterns for Bi-Level Image Rendition", *SID 77 Digest*, pp. 124-125.

Primary Examiner—James J. Groody
Assistant Examiner—Randall S. Svihla
Attorney, Agent, or Firm—Fitzpatrick, Cella, Harper & Scinto

[57] ABSTRACT

A color image processing apparatus processes an image, signal having a plurality of color components, by black signal synthesis and undercolor removal to remove a non-color component such as black from the color component signal. The non-color component is utilized to discriminate if an area of a color image represented by the color component signal is a high resolution area represented, for example, by characters, or is a gray level area. If the area is a high resolution area, the color components of the color component signal and the non-color component are processed in accordance with respective constant threshold memory data. However, if the color component signal is discriminated as being a gray level area, the respective color components and the non-color component are processed in accordance with respective dither memory data. Accordingly, faithful and clear images may be reproduced in both high resolution and gray level areas with faithful color balance. A method performed in accordance with the color imaging processing apparatus described above is also disclosed.

33 Claims, 5 Drawing Sheets

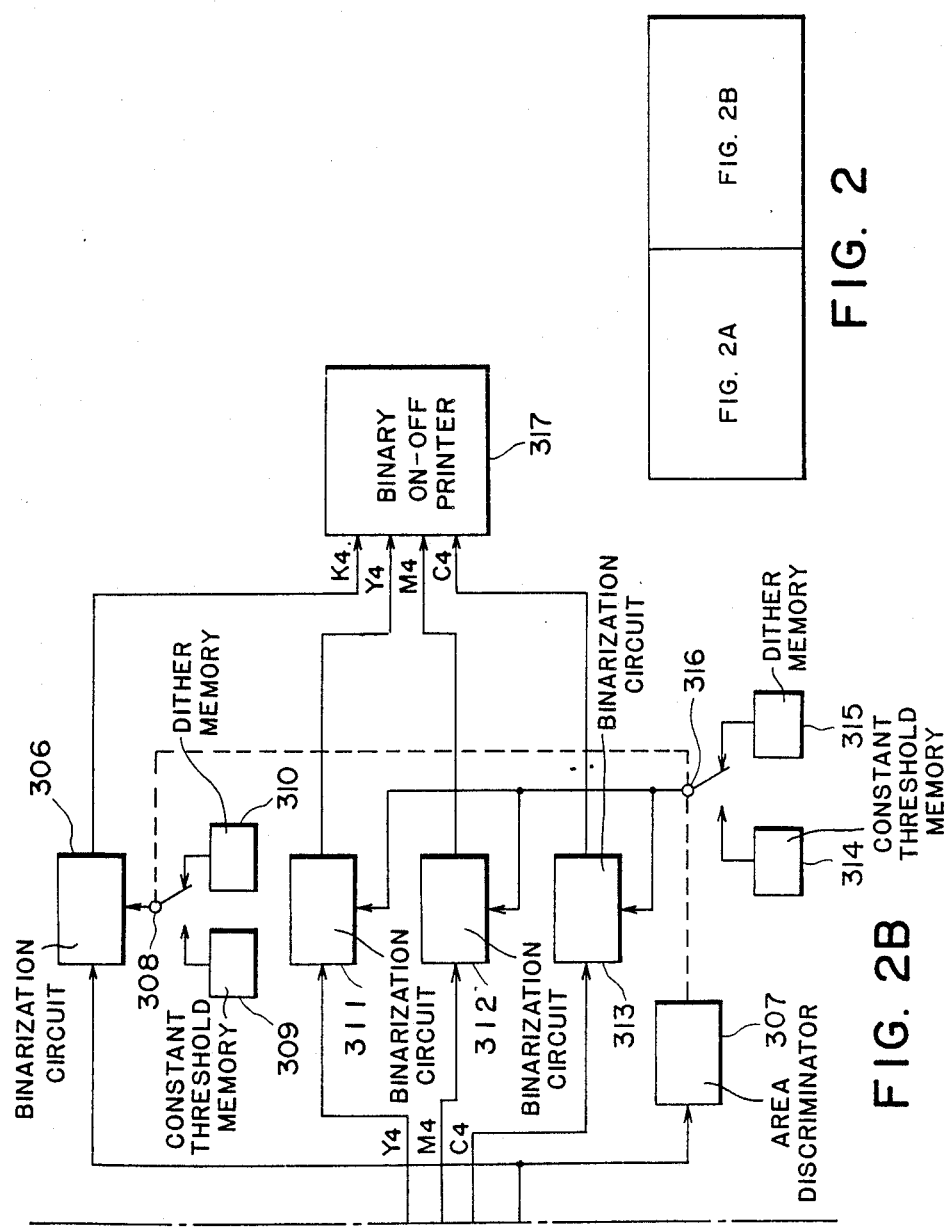

FIG.3(A)

| 5 | 5 | 5 | 5 |
|---|---|---|---|
| 5 | 5 | 5 | 5 |
| 5 | 5 | 5 | 5 |
| 5 | 5 | 5 | 5 |

SINGLE THRESHOLD TABLE MEMORY

FIG.3(B)

| 6 | 10 | 14 | 7 |
|---|---|---|---|
| 13 | 0 | 1 | 15 |
| 9 | 3 | 2 | 11 |
| 5 | 12 | 8 | 4 |

DITHER MATRIX TABLE MEMORY

FIG.4(A)

| 12 | 5 | 13 | 7 |
|---|---|---|---|
| 4 | 0 | 6 | 1 |
| 11 | 3 | 2 | 8 |
| 15 | 10 | 9 | 14 |

DITHER MATRIX TABLE MEMORY

FIG.4(B)

| 3 | 10 | 9 | 2 |
|---|---|---|---|
| 11 | 15 | 14 | 8 |
| 4 | 12 | 13 | 7 |
| 0 | 5 | 6 | 1 |

DITHER MATRIX TABLE MEMORY

DIGITAL COLOR IMAGE PROCESSING METHOD AND APPARATUS FOR DISCRIMINATING HIGH RESOLUTION AREAS OF A COLOR IMAGE SIGNAL AND CONTROLLING IMAGE PROCESSING IN ACCORDANCE WITH THE DISCRIMINATION

This application is a continuation of application Ser. No. 07/058,625 filed June 4, 1987, now abandoned, which is a continuation application of Ser. No. 06/608,238 filed May 8, 1984, now abandoned.

BACKGROUND OF THE INVENTION

1. Field of the Invention

The present invention relates to a color image processing method and system.

2. Description of the Prior Art

In a prior art color recording apparatus which uses a binary recording technique, an input image data is represented by a binary tone level by a dither matrix or a modified matrix thereof. As a result, in a high resolution area such as a character or symbol area, fine lines are broken by the dither and image quality deteriorates. One resolution method for a monochromatic image or a black-and-white image is shown in "Adaptive Switching of Dispersed and Clustered Halftone Patterns for Bi-Level Image Rendition" reported in SID 77 DIGEST by Kwan Y. Wong of IBM. Two approaches, one by Laplacian gradient and the other by maximum of corner sums are discussed therein. For a monochromatic image, an original image is checked to determine whether it is in a gray level image area or in a high resolution image area, such as a character area, to determine a dither processing or a single threshold processing for binarization.

The prior art method for discriminating the high resolution image area or the gray level image area for the monochromatic image is described below. FIG. 1 shows a configuration shown in Japanese Kokai 58-3374. Image input data 200 is alternately stored in line buffer memories 202 and 203 by positioning switch 201A. In FIG. 1, the memory 202 acts as an input line buffer memory and the memory 203 acts as an output line buffer memory. The memories 202 and 203 are n-line buffer memories. Numeral 204 denotes a block memory for determining whether an n×n-pixel area of an original image is a high resolution image data or a gray level image data and is connected either to memory 202 or memory 203 by switch 201B. It stores an n×n-pixel data. Numeral 205 denotes a discriminator for discriminating a type of the image data by checking the n×n-pixel data of the memory 204.

A maximum value Pmax and a minimum value Pmin of the pixel data in the block memory 204 are determined, and if (Pmax−Pmin)≧L, it is discriminated that the image in the block is in the high resolution image area and a threshold selection switch 209 is thrown to a position B to select single threshold matrix table 207. If (Pmax−Pmin)<L, it is discriminated that the image is in the gray level and a dither matrix table 206 is selected by an output signal of the discriminator 205. Numeral 208 denotes a comparator which compares threshold data selected by the switch 209 with pixel data from the block memory 204. An output of the comparator 208 is binarized and it is supplied to a binary ON/OFF printer 210 for binary image recording.

However, for a color image, an original image data is usually separated to R (red), G (green) and B (blue) color components by an input device. Thus, if the IBM technique described above is applied to each of the three color signals, discrimination results may differ for each color signal component in an input pixel area under consideration.

If the discrimination results differ for each color signal, it may occur that a print ink quantity C (cyan) for an input R component is converted to a dot pattern by the dither method and a print ink quantity M (magenta) for an input G component is converted to a dot pattern by the single threshold method. As a result, superimposition of colors may differ and a color reproduced may differ from a desired one. Further, fine lines in the C (cyan) component are broken by the dither and image quality deteriorates.

SUMMARY OF THE INVENTION

It is an object of the present invention to provide an image processing method and system which resolve the above problems.

It is another object of the present invention to provide a digital color image processing method and system which can reproduce a high resolution image.

It is another object of the present invention to provide a digital color image processing method and system which can reproduce a multi-tone level image.

It is other object of the present invention to provide a color image processing method and system which can reproduce a high resolution and multi-tone level image.

It is another object of the present invention to provide a color image processing method and system which determines if a non-color component of a color image signal is a high resolution image signal or a gray level image signal, and, if it is the high resolution image signal, which binarizes color component signals by a predetermined threshold signal.

It is another object of the present invention to provide a color image processing method and system which can improve the quality of a reproduced color image without providing a circuit or a memory for discriminating the high resolution image signal and the gray level signal for each color.

The above and other objects of the present invention will be apparent from the following description of the invention.

BRIEF DESCRIPTION OF THE DRAWINGS

FIGS. 2, 2A and 2B show a color image processing circuit of the present invention, FIGS. 3(A), 3(B), and 4(A), 4(B) illustrate thresholds.

DETAILED DESCRIPTION OF THE PREFERRED EMBODIMENTS

Figure 1:
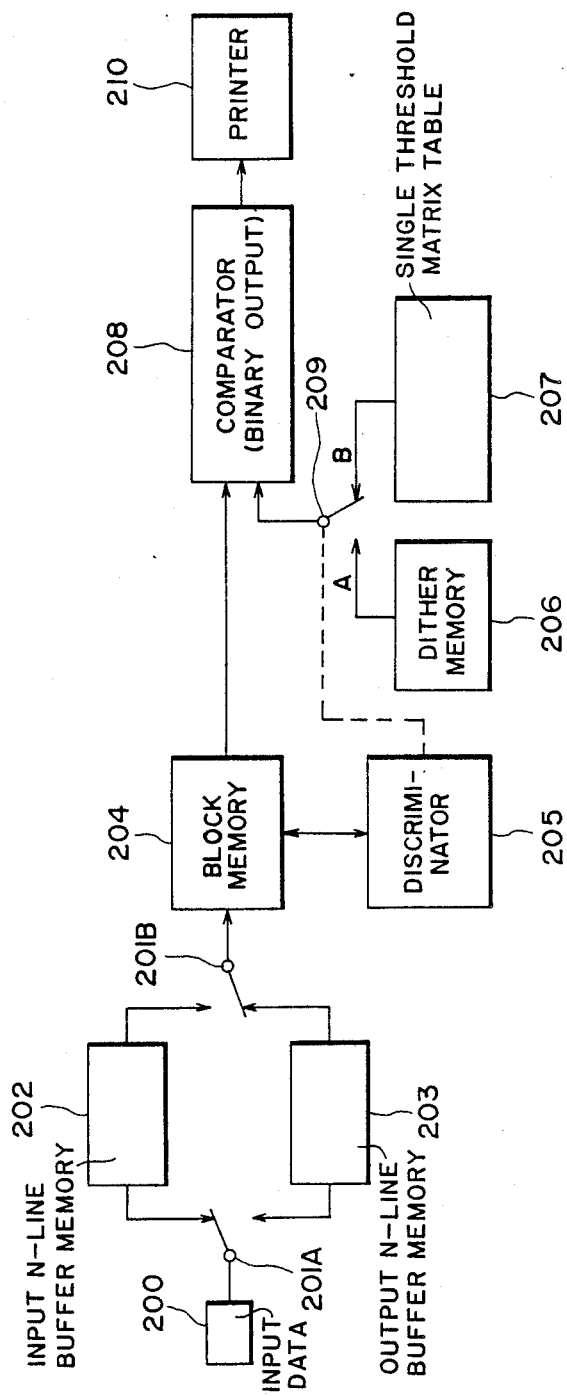
FIG. 1 shows a prior art image processing circuit.
Figure 2A:
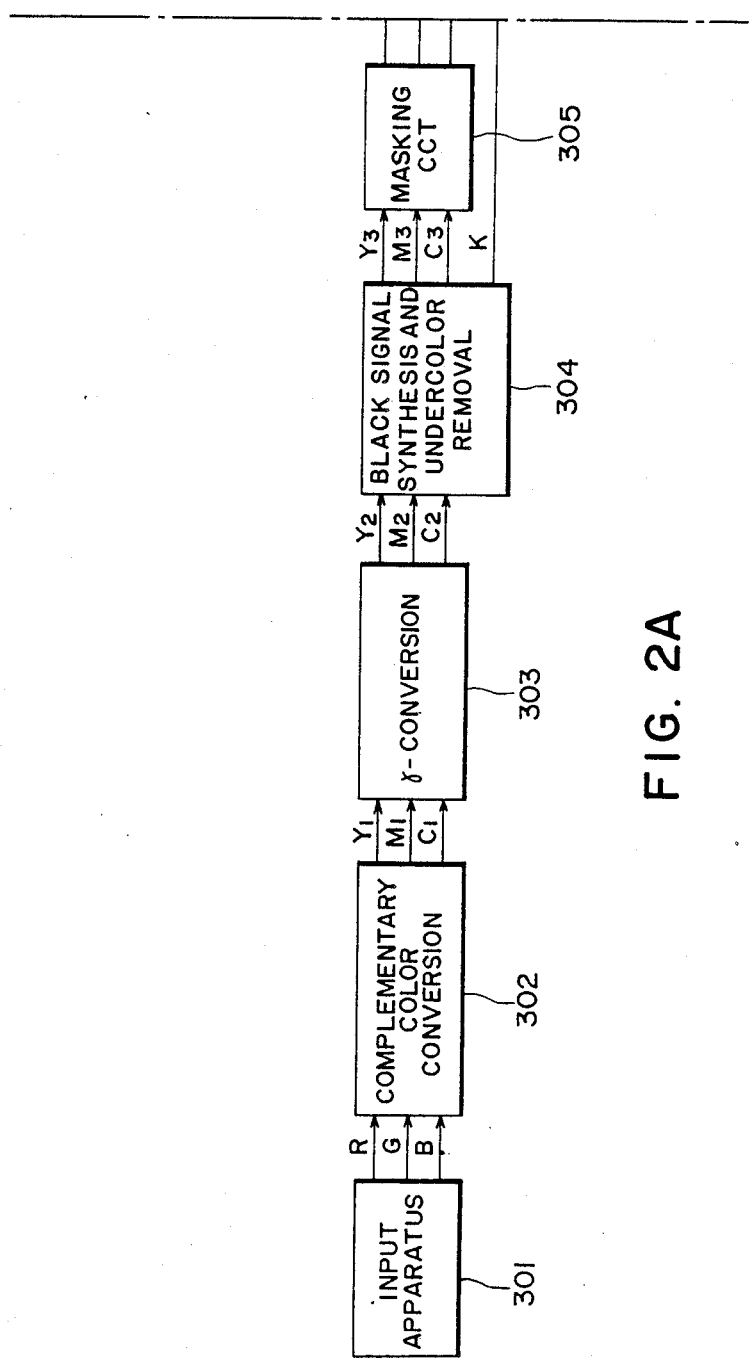

FIG. 2 shows how FIGS. 2A and 2B are arranged to illustrate one embodiment of the present invention. Numeral 301 denotes a three-color decomposing original image reader in a color image forming apparatus. It produces A/D converted B, G and R component signals in parallel. Numeral 302 denotes a known circuit which converts the R, G and B signals to complementary color signals Y1, M1 and C1, respectively, numeral 303 denotes a circuit which γ-converts and tonality-corrects the Y1, M1 and C1 signals to produce signals Y2, M2 and C2, respectively, numeral 304 denotes an underlying color elimination circuit also called a black signal synthesis and undercolor removal circuit for separating a black component (non-color component) from color components, numeral 305 denotes a known masking circuit for correcting color reproduction, numeral 306 denotes a binarization circuit for the black component K, and numerals 311-313 denote binarization circuits for the color components Y4, M4 and C4, respectively. They are constructed as comparators and a threshold signal for the binarization circuit 306 is supplied from a constant threshold memory 309 or a dither memory 310, and thresholds for the binarization circuits 311-313 are supplied from a constant threshold memory 314 or a dither memory 315. Numeral 307 denotes an area discriminator similar to that shown in FIG. 1, for the black component (non-color) signal K. Numerals 308 and 316 denote a threshold selectors and 317 denotes a binary ON/OFF printer which prints an image by superimposition of toner inks in accordance with binary signals Y4, M4, C4 and K4.

Based on the three color component signals R, G and B (R: red, G: green, B: blue) from the original image reader 301, output data representing ink quantities for C, M and Y (C: cyan, M: magenta, Y: yellow) to be printed are produced by the complementary color converter 302. That is, a calculation is performed to obtain the proper quantities of the print inks represented by respective print ink quantity signals C1, M1, and Y1 from the color component signals R, G, and B. For example, if R=200, C1 is obtained using the formula C1=U−R where U=$FF_H$ in hexidecimal notation (=255). Therefore, C1=U−200=55. The converted data Y1, M1 and C1 are converted to the signals Y2, M2 and C2, respectively, by the input/output characteristic converter 303 called the γ-conversion circuit. The non-color component and the color components are separated from the components Y2, M2 and C2 by the circuit 304. Since the black component K corresponds to a minimum level of Y2, M2 and C2, the component K determines the non-color component. On the other hand, the color components are determined by subtracting the non-color component from Y3=(Y2−K$\alpha$1)$\beta$1, M3=(M2−K$\alpha$2)$\beta$2 and C3=(C2−K$\alpha$3)$\beta$3. The symbols $\alpha$1, $\alpha$2, and $\alpha$3 denote constants for adjusting the quantity of black and the symbols $\beta$1, $\beta$2, and $\beta$3 denote constants for adjusting the respective colors. These correcting or adjusting parameters are utilized by the circuit 304 to convert Y2, M2, and C2 respectively to Y3, M3, and C3. The color components are color-corrected by the color correction (masking) circuit 305, which produces Y4, M4 and C4. The signals K, Y4, M4 and C4 are data representing ink quantities of colors to be printed. The area discriminator 307 corresponds to 201A, 201B, 202-205 shown in FIG. 1 and it discriminates a high resolution area or the gray level area based on the data in the black component pixel block (n×n pixels). If the discriminator 307 discriminates a high resolution area, the threshold selection switches 308 and 316 are actuated to connect the threshold source to the constant threshold memories 309 and 314. The binarization circuits 306 and 311-313 compare the input image data with the single threshold data to convert it to binary data which is then supplied to the binary ON/OFF printer for color reproduction.

One page of reproduced image instead of the n×n block may be discriminated.

In the present invention, the discrimination is made based on the K signal (block signal) derived from the Y, M and C signals because the characters and the symbols are black in many cases for clerical use and black is a most distinguishable color. Accordingly, if the black component is discriminated as the high resolution area after the color processing, the black component as well as the other three color components (actually black and two of Y, M and C in many cases) select the single threshold matrix table memories. Since the black component dither pattern is different from the dither patterns for the other colors, the threshold pattern table or dither memory 310, which is different from that for the other three colors, is provided. The Y, M and C components use the common constant threshold table memory 314 and dither matrix table memory 315. FIG. 3A shows an example of the constant or single threshold table memory 309 and FIG. 3B shows an example of the dither matrix table memory 310.

Different dither matrices and different single threshold matrices may be used for Y, M, C and K to improve image quality.

By using the different dither matrix memories 310 and 315 as described above, the image can be printed so that black dots may be transferred into an area having no color components as a matrix in a way that prevents concealment of color components in another matrix that might otherwise be caused by overprinting of black dots on the color components. FIGS. 4A and 4B show examples thereof where FIG. 4 shows a black dither matrix memory table and FIG. 4B shows a dither matrix memory table for the Y, M, and C signals. With this arrangement, the erasure of the color component when black is overprinted on a one-color dot or multi-color dot is prevented.

In the matrix table memories of FIGS. 3A and 3B, it is assumed that the input image data is in 0-15 levels and the 4×4-pixel block is used as a unit. In FIG. 3A, a slice level is fixed to 5, and in FIG. 3B, a dither pattern arrangement is used. FIG. 3A is referred to as the single threshold table memory pattern, and FIG. 3B is referred to as the dither matrix table memory pattern. The thresholds of the single threshold pattern memories 309 and 314 may be changed so as not to reproduce a gray level background.

Figure 5:
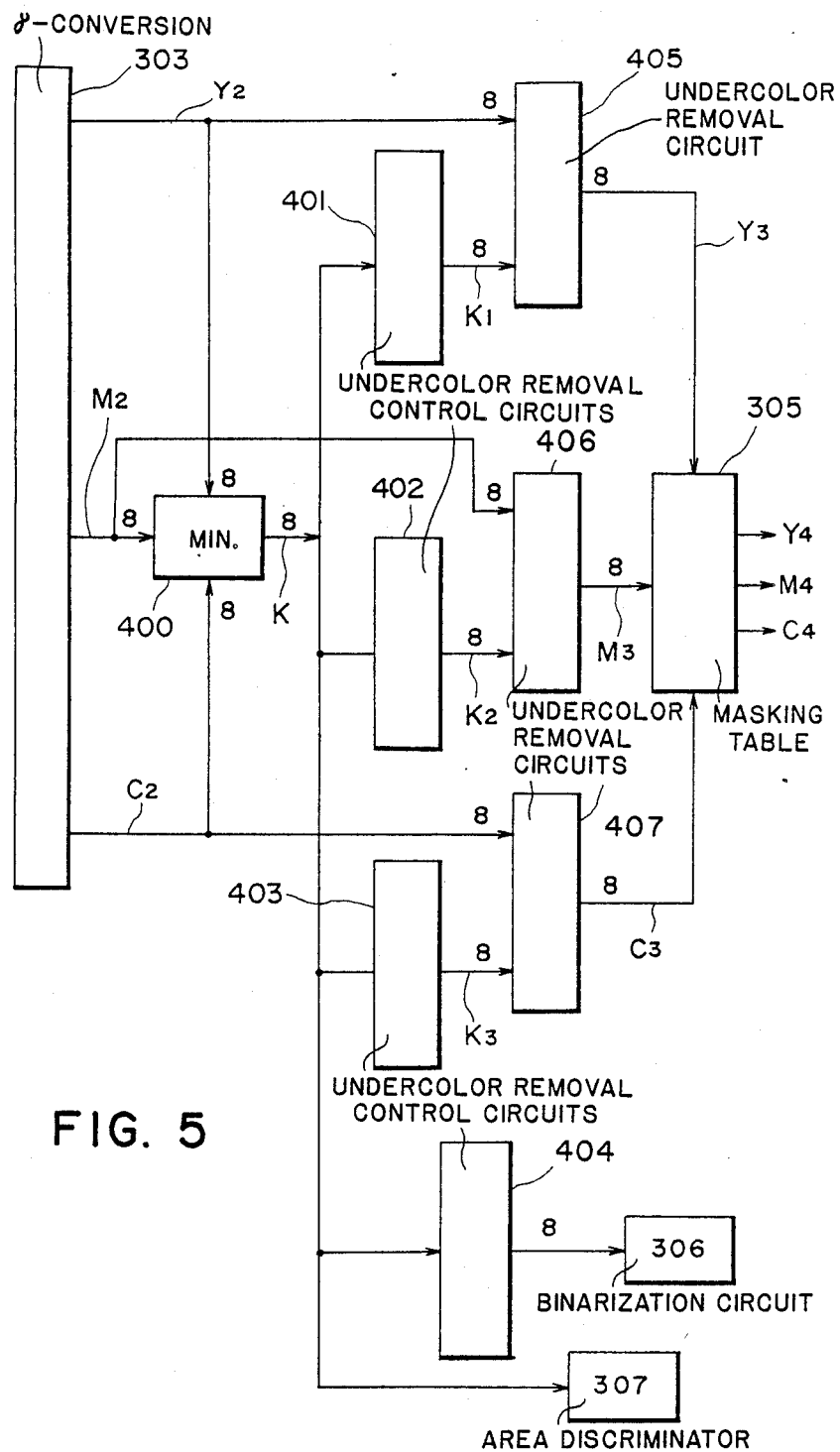
FIG. 5 shows another embodiment of the color image processing circuit.

FIG. 5 shows another embodiment of the black signal synthesis and undercolor removal circuit 304 of FIG. 2. Numeral 400 denotes a circuit for determining a minimum one of the image data Y2, M2 and C2 received from the γ-conversion circuit 303. It determines the minimum value (non-color component) K by comparing the respective colors. Numerals 401-404 denote circuits for controlling the underlying color elimination quantities for the respective colors, that is undercolor removal control circuits. They control the elimination quantities by looking up the table data. Numerals 405-407 denote underlying color elimination circuits, that is undercolor removal circuits, which calculate differences between the 8-bit density data Y2, M2 and C2 of the original image and the 8-bit underlying color elimination quantity data K1-K3, to produce the color component density data Y3, M3 and C3, respectively. The non-color data K is supplied to the area discriminator 307 which discriminates the tonality. The binarization circuit 306 receives the data from the undercolor removal control circuit 404 to binarize the black component.

The signals Y3, M3 and C3 are mask-processed by looking up the memory table data and converting it to the color data Y4, M4 and C4, which are then binarized, with the masking table 305.

The binarized data are stored in a one-line memory (not shown). In this manner, a synchronous printing is attained even if there is a slight difference between the color processing speed and the digital printing speed. One line corresponds to one read line of the original image and one print line.

Instead of the circuits 306 and 311-313 for the binarization, a ROM which contains a table showing a compare result of the input data and the pattern data may be used and the ROM may be addressed by the data Y4, M4, C4 and K to read out Y4-K4.

For a specific color component such as the C component, tonality may be checked for each block, and if tonality is not detected, the binarization of other components including the specific component may be carried out at a constant threshold to prevent any reduction of the resolution for red images corresponding to that C color component.

What we claimed is:

1. A color image processing method comprising the steps of:
    discriminating whether a given area of a color image is a high-resolution area by performing an area-type discriminating operation on a specified color component of a color image signal, the color image signal having a plurality of color components and representing the color image; and
    changing an image processing for the plurality of color components of the color image signal, including an image processing for the specified color component thereof, to an image processing for a line image on the basis of the result of discrimination in said discriminating step that the given area is a high-resolution area.

2. A color image processing method according to claim 1, wherein the specified color component is a black component.

3. A color image processing method according to claim 1, wherein the color image is divided into a plurality of predetermined block areas, the given area corresponding to a selected one of the predetermined block areas, and wherein said discriminating step is carried out for each of the predetermined block areas of the color image.

4. A color image processing method according to claim 3, wherein each of the predetermined block areas is a matrix of n×n pixels wherein n is an integer.

5. A color image processing method according to claim 1, wherein the image processing for a line image involves using a matrix of threshold levels which is different from a matrix of threshold levels used in an image processing applicable to areas of the color image which are not high-resolution areas.

6. A color image processing method comprising the steps of:
    discriminating whether a given area of a color image is a gray-level area by performing an area-type discriminating operation on a specified color component of a color image signal, the color image signal having a plurality of color components and representing the color image; and
    changing an image processing for the plurality of color components of the color image signal, including an image processing for the specified color component thereof, to an image processing for a halftone image on the basis of the result of discrimination in said discriminating step that the given area is a gray-level area.

7. A color image processing method according to claim 6, wherein the specified color component is a black component.

8. A color image processing method according to claim 6, wherein the color image is divided into a plurality of predetermined block areas, the given area corresponding to a selected one of the predetermined block areas, and wherein said discriminating step is carried out for each of the predetermined block areas of the color image.

9. A color image processing method according to claim 8, wherein each of the predetermined block areas is a matrix of n×n pixels wherein n is an integer. applicable to areas of the color image which are not high-resolution areas.

10. A color image processing method according to claim 6, wherein the image processing for a halftone image involves using a matrix of threshold levels which is different from a matrix of threshold levels used in an image processing applicable to areas of the color image which are not gray-level areas.

11. A color image processing system comprising:
    color image signal inputting means for inputting a color image signal representing a color image and having a plurality of color components;
    discriminating means for discriminating whether a given area of the color image is a high-resolution area by performing an area-type discrimination operation on a specified color component of the color image signal; and
    means for changing an image processing for the plurality of color components of the color image signal, including an image processing for the specified color component thereof, to an image processing for a line image on the basis of the result of discrimination by said discriminating means that the given area is a high-resolution area.

12. A color image processing system according to claim 11, wherein the image processing for a line image involves using a matrix of threshold levels which is different from a matrix of threshold levels used in an image processing applicable to areas of the color image which are not high-resolution areas.

13. A color image processing system comprising:
    color image signal inputting means for inputting a color image signal representing a color image and having a plurality of color components;
    discriminating means for discriminating whether a given area of the color image is a gray-level area by performing an area-type discrimination operation on a specified color component of the color image signal; and
    means for changing an image processing for the plurality of color components of the color image signal, including an image processing for the specified color component thereof, to an image processing for a halftone image on the basis of the result of discrimination by said discriminating means that the given area is a gray-level area.

14. A color image processing system according to claim 13, wherein the image processing for a halftone image involves using a matrix of threshold levels which is different from a matrix of threshold levels used in an image processing applicable to areas of the color image which are not gray-level areas.

15. A color image processing system according to either one of claims 11 and 13, wherein the color image is divided into a plurality of predetermined block areas, the given area corresponding to a selected one of the predetermined block areas, and wherein the discrimination by said discriminating means is carried out for each of the predetermined block areas of the color image.

16. A color image processing system according to claim 15, wherein each of the predetermined block areas is a matrix of n×n pixels wherein n is an integer.

17. A color image processing system according to either one of claims 11 and 13, wherein the specified color component is a black component.

18. An apparatus comprising:
    (a) means for supplying a color image signal including a plurality of color component signals;
    (b) means for generating a non-color component signal by using at least two of said plurality of color component signals; and
    (c) means for discriminating whether an area of a color image with which the color image signal is associated is a high-resolution area on the basis of the non-color component signal generated by said generating means.

19. An apparatus according to claim 18, further comprising:
    (d) means for binarizing the plurality of color component signals by using a predetermined threshold signal when the area is discriminated to be a high-resolution area by said discriminating means.

20. An apparatus according to claim 19, further comprising:
    (e) means for supplying the binarized signals to a signal handling apparatus.

21. An apparatus according to claim 18, wherein said non-color component signal is a black component signal, and wherein said generating means produces the black component signal by using the plurality of color component signals.

22. An apparatus according to claim 18, wherein said supplying means comprises a color original reading apparatus which generates the color image signal by reading a color image on a color original.

23. An apparatus according to claim 18, wherein said generating means comprises means for selecting from the plurality of color component signals the color component signal with the minimum value, and means for producing the non-color component signal based on the selected color component signal.

24. An apparatus according to claim 18, wherein the color component signals are complementary color component signals.

25. An apparatus according to claim 24, wherein the complementary color component signals comprise yellow, magenta and cyan component signals.

26. An apparatus comprising:
    (a) means for supplying a color image signal including a plurality of color component signals;
    (b) means for generating a non-color component signal by using at least two of said plurality of color component signals; and
    (c) means for discriminating whether an area of a color image with which the color image signal is associated is a gray-level area on the basis of the non-color component signal generated by said generating means.

27. An apparatus according to claim 26, further comprising:
    (d) means for binarizing the plurality of color component signals by using a predetermined threshold signal when the area is discriminated to be a gray-level area by said discriminating means.

28. An apparatus according to claim 27, further comprising:
    (e) means for supplying the binarized signals to a signal handling apparatus.

29. An apparatus according to claim 26, wherein said non-color component signal is a black component signal, and wherein said generating means produces the black component signal by using the plurality of color component signals.

30. An apparatus according to claim 26, wherein said supplying means comprises a color original reading apparatus which generates the color image signal by reading a color image on a color original.

31. An apparatus according to claim 26, wherein said generating means comprises means for selecting from the plurality of color component signals the color component signal with the minimum value, and means for producing the non-color component signal based on the selected color component signal.

32. An apparatus according to claim 26, wherein the color component signals are complementary color component signals.

33. An apparatus according to claim 32, wherein the complementary color component signals comprise yellow, magenta and cyan component signals.

* * * * *

UNITED STATES PATENT AND TRADEMARK OFFICE
CERTIFICATE OF CORRECTION

PATENT NO. : 4,930,007

DATED : May 29, 1990

INVENTOR(S) : Susumu Sugiura et al

It is certified that error appears in the above-identified patent and that said Letters Patent is hereby corrected as shown below:

On the title page item [56] References Cited:
    Other Publications, "Dr. -Ing. Rudolf Mell" should read
                      --Dr. Ing. Rudolf Mell--.

COLUMN 4

Line 2, "(block signal)" should read --(black signal)--.

COLUMN 6

Line 17, "appli-" should be deleted.
    Line 18, "line 18" should be deleted.
    Line 19, "resolution areas." should be deleted.

Signed and Sealed this

Twenty-first Day of April, 1992

Attest:

HARRY F. MANBECK, JR.

*Attesting Officer*        *Commissioner of Patents and Trademarks*